July 5, 1966

E. S. PEARCE 3,259,156

SAWMILL CARRIAGE DRIVE

Filed May 13, 1964

INVENTOR.
EDWARD S. PEARCE
BY
ATTORNEY

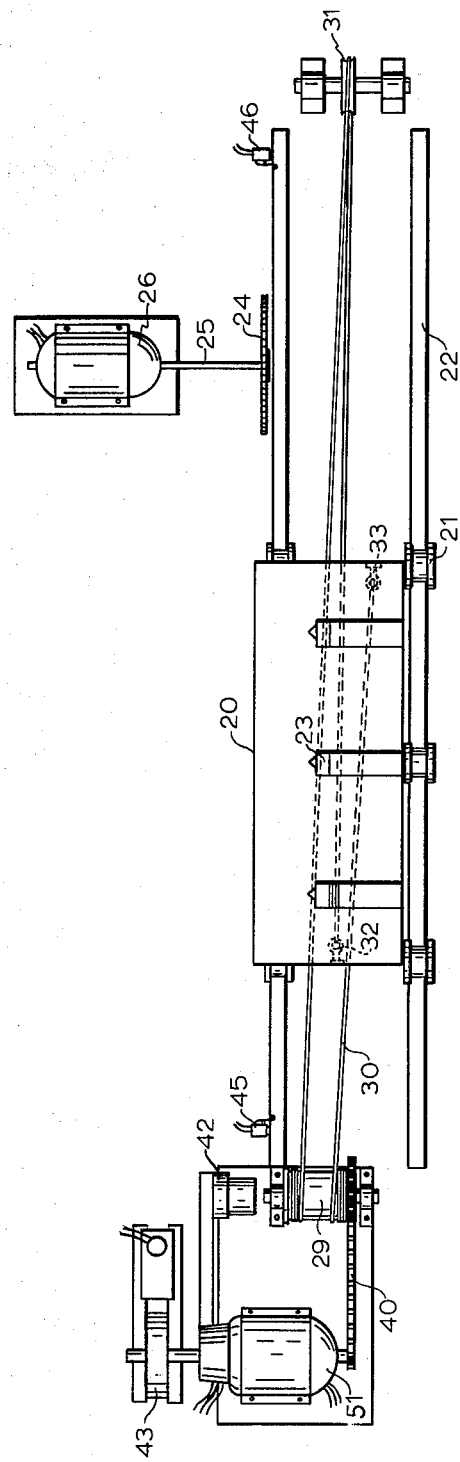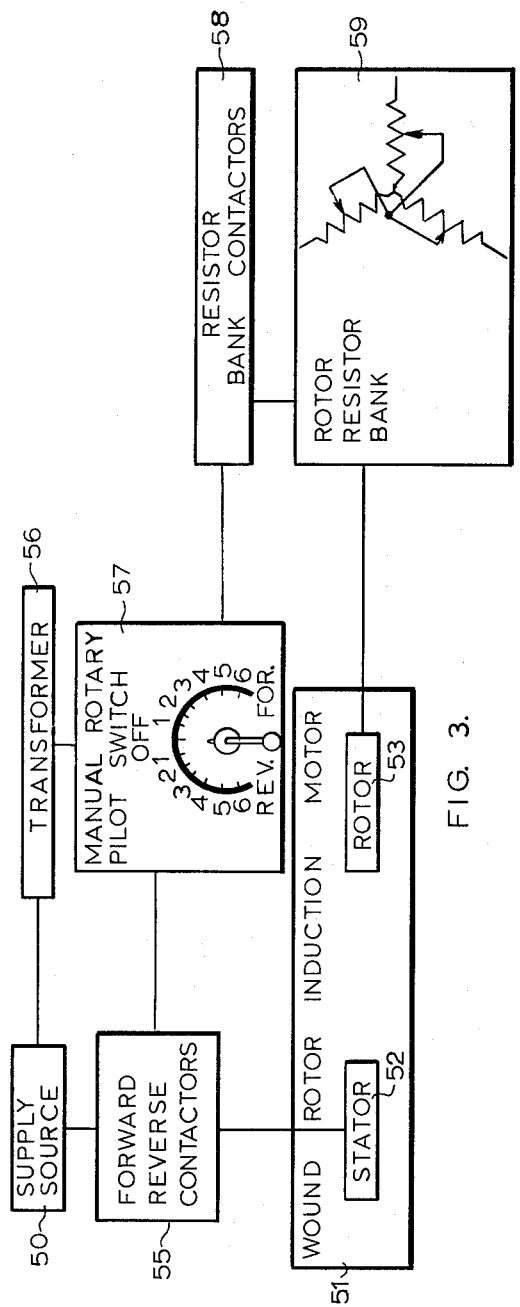

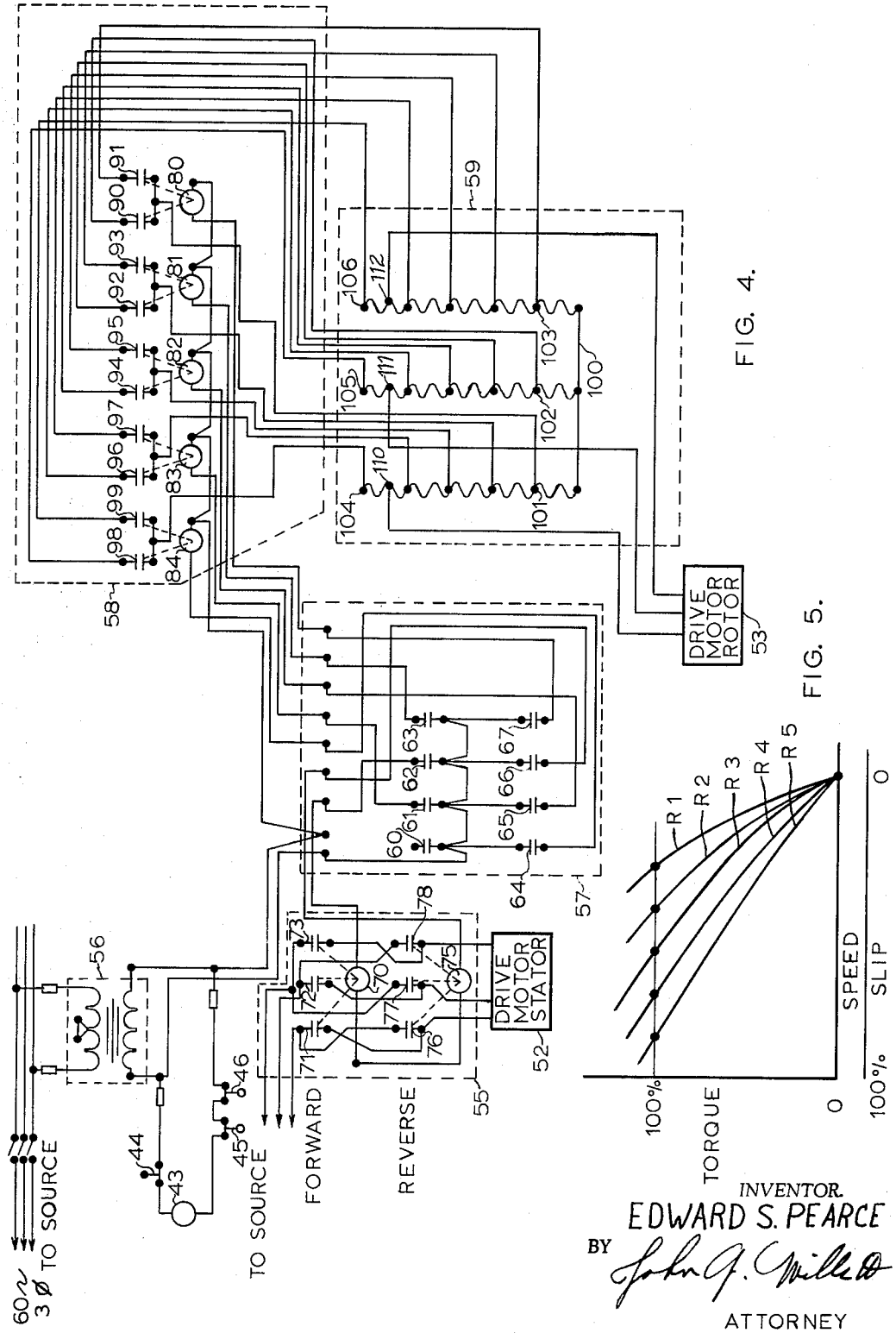

United States Patent Office 3,259,156
Patented July 5, 1966

3,259,156
SAWMILL CARRIAGE DRIVE
Edward Samuel Pearce, Zebulon, N.C., assignor, by direct and mesne assignments, of one-third each to William S. Ward, Martha Ward Chapman, and Robert E. Ward, Jr., all of Raleigh, N.C.
Filed May 13, 1964, Ser. No. 367,120
5 Claims. (Cl. 143—52)

This invention relates to sawmill carriages and particularly to an electric motor drive and control for such carriages. More specifically, the invention is directed to a wound rotor electric motor cable drive and motor control for a sawmill carriage which enables the log or partially cut timber, as the case may be, to be fed into the saw with a uniform force irrespective of the carriage speed.

The cutting of logs into lumber and large lumber into boards is conventionally carried out by mounting the uncut wood on a carriage and reciprocating the carriage past a rotating saw blade. The saw blade is conventionally driven by one source of power and the carriage by another source of power though various relatively complex feedback type circuits have been proposed to connect the saw power source and the carriage power source. The present invention is primarily concerned with the carriage drive and in this regard it may be mentioned that the prior art on carriage drives has taught various direct current reversible electric motor carriage drive systems, so called steam "shotgun" carriage drive feeds as well as employment of pairs of unidirectional motors arranged so that one motor drives the carriage in the opposite direction. In any event, prior art carriage drives have been inherently difficult to operate, have exhibited a widely variable speed-torque characteristic and have been difficult to maintain.

It is therefore a general object to provide an improved drive motor and motor control for sawmill carriages.

Another object is to provide for a sawmill carriage drive of the drum and cable type an improved motor and motor control which is substantially free of pauses, jerks, surges and the like commonly experienced with conventional apparatus.

Another object is to provide an improved sawmill carriage motor drive and control having a sensitive control over a speed range from zero to several hundred feet per minute.

Another object is to provide a sawmill carriage motor drive and control in which the operator can control energization of the motor speed of the motor and reverse braking with a single manual control.

Another object is to provide a sawmill carriage which enables unskilled operators to obtain relatively high cutting efficiencies.

Another object is to provide a sawmill carriage motor drive and control which exhibits relatively high torque between minimum and maximum speeds of the carriage.

These and other objects and advantages will appear from the accompanying specification and drawings, in which:

FIGURE 2 is a plan view similar to FIGURE 1.

FIGURE 3 is a block diagram of a circuit embodying the invention.

FIGURE 4 is a schematic electrical diagram following the block diagram of FIGURE 3.

FIGURE 5 represents typical speed-torque curves obtained in circuitry embodying the invention.

Figure 1:
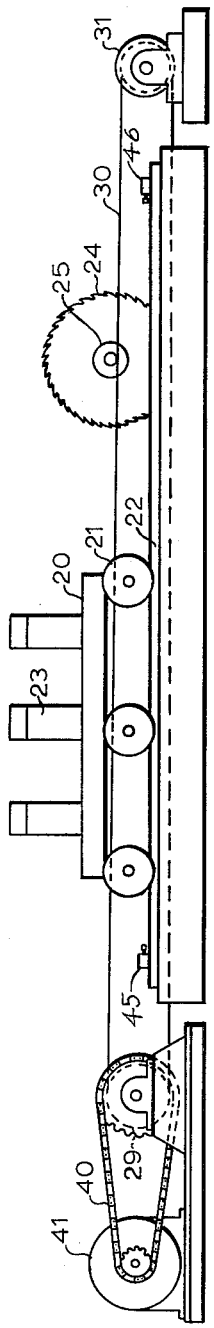
FIGURE 1 is an elevational view of a typical sawmill carriage embodying the invention.

FIGURES 1 and 2 illustrate a typical sawmill carriage embodying the invention in which there is shown a carriage 20 equipped with wheels 21 adapted to ride on the carriage rails 22. Suitable dog assemblies 23 are provided for holding the timber on the carriage. A saw 24 mounted on a shaft 25 is driven by a suitable motor 26 and cuts the timber as it is brought to the saw by the carriage. A drum 29 is entrained with a suitable cable 30 which is further entrained over a pulley 31 and has its ends fastened to carriage 20 as indicated at 32 and 33. Drum 29 is made to oscillate by means of a drive which includes a chain 40 driven by an induction type wound rotor motor 51 later referred to. Motor 51 is cooled by means of a suitable conventional fan represented at 42, the controlling circuitry not being shown or discussed further. For purposes of emergency braking, a solenoid, spring set shoe, type electric brake is provided as somewhat schematically represented at 43. A manual switch 44 (FIGURE 4) may be employed for manual stopping. In order to prevent overtravel of the carriage, suitable limit switches are provided at 45 and 46 which act, as later described, to actuate the brake 43.

As previously mentioned, the circuitry of the invention embodiment used for illustration is based on employment of a three phase wound rotor induction motor having an external rotor resistor bank that can be regulated to control the speed and torque characteristics of the motor. In conjunction with this system of speed and torque control, there is employed means for reversing the phases applied to the motor stator in order to obtain braking and reversal in the direction of motor rotation. Thus, the motor can be reversed and the reversing effect used to brake the motor and carriage towards the end of a particular carriage travel. In view of the nature of the circuitry, it becomes possible for both reversing control and speed-torque control to be handled by a single manually operated rotary pilot switch.

In actual practice it has been discovered that this is an especially unique arrangement since even an unskilled operator quickly develops the knack of operating the pilot switch such that it serves simultaneously as a braking device, an acceleration control and a speed control. The operator can, with very lattle practice, develop a feel for maintaining the maximum cutting rate when cutting in the wood and for knowing just when to reverse the carriage to obtain the maximum number of lines per minute. For example, with a 3,000 lb. carriage and a thirty horsepower motor it is possible for a relatively unskilled operator to cut at the rate of fourteen (14) lines per minute. The same unskilled operator can readily obtain the same number of lines per minute with a 100 horsepower motor driving a 12,000 lb. carriage. Thus, even though different size lags and carriage weights present substantially different inertia, accelerating and braking problems, the invention has demonstrated its ability to maintain high production over the rate and horsepower range quoted.

Considering the general arrangement of circuitry before dealing with it in detail, reference is made to the block diagram in FIGURE 3 in which the supply source is represented at 50. The wound rotor induction motor is represented at 51 with the stator being represented by 52 and the rotor by 53. As shown in FIGURE 3, the stator is energized by the supply source 50 through a set of forward-reverse contactors 55. The supply source 50 is further connected through a transformer 56 to a manual rotary pilot switch 57. An example of a suitable pilot switch is the type rotary switch shown and described in Bulletin 806 published by the Allan-Bradley Company of Milwaukee, Wisconsin. The pilot switch 57 is further connected to a set of contactors 58 labelled in FIGURE 3 "resistor bank contactors" which control a rotor resistor bank 59. That is, selective energization of the contactors 58 controls the amount of resistance placed in the various rotor phases at various times during the sawing operation.

The manual rotary pilot switch 57 when moved in the forward direction causes the forward-reverse contactors 55 to connect the supply source 50 and stator 52 such that the stator is energized to cause the motor 51 to rotate in a given direction. When the rotary pilot switch 57 is moved in the opposite direction, it causes the forward-reverse contactors 55 to connect the source 50 and stator 52 such that the motor is caused to rotate in an opposite direction. Thus, the direction of motion of the rotary pilot switch 57 determines the directions of rotation of motor 51.

The manual rotary pilot switch in addition to controlling the direction of rotation is also connected to control the resistor bank contactors 58 which control the value of resistance placed into each phase of the rotor 53 and thus switch 57 controls the speed of motor 51.

Turning to the more detailed circuit of FIGURE 4, the same numerals employed in connection with the block diagram of FIGURE 3 represent the same elements of FIGURE 4, such elements being surrounded by blocks of dashed lines. A number of additional elements not referred to in FIGURE 3 are shown in FIGURE 4.

Referring to FIGURE 4, the pilot switch 57 includes manually operated contacts 60–67 all of which are open when the pilot switch is in "off" position, contact 60 being a spare, contact 62 being the "forward" manual contact controls coil 70 which in turn controls "forward" relay contacts 71, 72 and 73. Similarly contact 63, the "reverse" manual contact controls coil 75 which in turn controls "reverse" relay contacts 76, 77 and 78. That is, when the pilot switch is moved in the forward direction the first manual contact to close and remain closed during forward movement of the pilot switch is contact 62. Closing of contact 62 by causing coil 70 to be energized causes contacts 71, 72 and 73 to close and the stator 52 to be energized for forward rotation and carriage 20 to be moved in a corresponding direction. On the other hand, when the pilot switch is moved in the "reverse" direction contact 66 closes, coil 70 is deenergized, contacts 71, 72 and 73 are open, coil 75 is energized, contacts 76, 77 and 78 are closed, the stator 52 is energized for reverse rotation and carriage 20 is moved in a corresponding opposite direction.

Having described the manner in which pilot switch 57 controls direction, attention is next directed to the manner of controlling speed and torque. Typical speed, slip and torque curves for a wound rotor induction motor with an external variable rotor resistor bank are shown in FIGURE 5. It will be noted that torque can be maintained at or near 100% over a wide speed variation by controlling rotor resistance represented by curves $R_1$–$R_5$. Curve $R_1$ represents the least rotor resistance, whereas curve $R_5$ represents the highest rotor resistance. In view of the complex torque problem encountered in sawing lumber of varying size, hardness and moisture, this type of induction motor offers an obvious advantage especially when incorporated in a control system of the nature of the present invention. Referring now more specifically to torque control, the nature of pilot switch 57 is such that contacts 67, 63, 65, 61, 64 and 60 will be closed and will remain closed in the sequence listed in both forward and reverse movements of pilot switch 57. The rotor resistor bank 59 is connected as a three phase Y with equal amounts of resistance in each leg. On startup each leg has its maximum resistance which means that carriage 20 initially moves the lumber into the saw 24 at a speed and with a force corresponding to maximum rotor resistance. However, as contacts 67, 63, 65, 61, 64 and 60 are closed in that sequence, coils 80, 81, 82, 83 and 84 are sequentially energized. Coil 80 controls contacts 90, 91; coil 81 controls contacts 92, 93; coil 82 controls contacts 94, 95; coil 83 controls contacts 96, 97; and coil 84 controls contacts 98, 99. Using coil 80 as an example, it can be seen that the common point or neutral of the Y which is initially established by the connecting wire 100 is moved when coil 80 is energized. That is, energization of coil 80 connects points 101, 102 and 103 together as the Y neutral. Moving of the neutral furthermore means decreasing the resistance of each phase of the rotor such as moving from curve $R_5$ to curve $R_4$ of FIGURE 5. In a similar manner energization of coils 81, 82, 83 and 84 will move the Y neutral until points 104, 105 and 106 are joined together corresponding to curve $R_1$ and utilization of only such resistance as is collected into the rotor circuit by the fixed rotor taps on the bank and as is inherent within the rotor windings themselves. That is, it will be noticed that the rotor taps on the bank are fixed at points substantially removed from the bank neutral and that coils 80–84 effectively move the neutral above and below such taps (110–112).

Thus, it can be seen that many practical operating advantages are achieved. The operator is given a single manual control with which he can control direction of carriage travel and in addition both speed and torque of the carriage by floating the neutral point of the resistor bank. Furthermore, with a nominal amount of practice the operator can learn to quickly reverse his manual control (the pilot switch) at the end of each off stroke in time to use the reversal of the motor as an effective and smooth braking device. The motor is thus effectively energized at all times and is at all times either driving or braking the carriage. Over-travel is of course prevented by means of the limit switches 45, 46 and the brake 43.

What is claimed is:

1. In sawmill apparatus of the type having a carriage for conveying uncut wood, a track mounting said carriage, a saw, an alternating current power source, a first motor connected to said source and driving said saw, a drum and cable drive connected to reciprocate said carriage on said track, in combination therewith, a second alternating current multi-phase induction motor having a wound rotor, a wound stator, and an external multiphase bank of resistors connected to said rotor; a first set of electrically actuated contactors connected between said source and stator and being arranged to connect said stator and source and selected the phase relation therebetween; a second set of electrically actuated contactors connected to said bank and being arranged to alter the value of bank phase resistance connected to the respective phases of said rotor; means mechanically connecting said induction motor and drum; and a manual bi-directional rotary pilot switch including a third set of mechanically actuated contactors, said third set of contactors being effective to close said second set of contactors in a predetermined sequence in each direction of rotation of said switch and thereby control speed and torque of said second motor as said saw enters said wood, said third set of contactors being further effective to selectively close said first set of contactors and thereby control direction of rotation of and braking of said second motor according to the direction of rotation of said switch.

2. In a sawmill apparatus as claimed in claim 1, in which said stator and rotor are three phase, in which said bank of resistors is connected in Y, and in which said third set of contactors control said value by controlling the neutral point of said Y.

3. In a sawmill apparatus as claimed in claim 1, in which the values of said resistors are so selected as to maintain a substantially constant motor torque as said third set of contactors are sequentially closed as said saw enters said wood.

4. In a sawmill apparatus as claimed in claim 1, in which said bank is three phase Y and said contactors operate in pairs to connect together corresponding taps on each phase of said bank Y and thereby effect a change in the neutral of said bank.

5. In a sawmill apparatus as claimed in claim 1, in which said bank is Y connected and has both a fixed and a floating neutral, said floating neutral being established by said second contactors making corresponding connections within said bank.

No references cited.

WILLIAM W. DYER, JR., *Primary Examiner.*

WAYMOND D. BRAY, *Assistant Examiner.*